(12) United States Patent
Morrison

(10) Patent No.: US 11,822,394 B2
(45) Date of Patent: Nov. 21, 2023

(54) INFORMATION HANDLING SYSTEM VARIABLE FEEL INPUT DEVICE

(71) Applicant: Dell Products L.P., Round Rock, TX (US)

(72) Inventor: Jason S. Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 17/147,224

(22) Filed: Jan. 12, 2021

(65) Prior Publication Data
US 2022/0221909 A1    Jul. 14, 2022

(51) Int. Cl.
G06F 1/16      (2006.01)
G06F 3/02      (2006.01)
H01H 13/7073   (2006.01)

(52) U.S. Cl.
CPC .......... *G06F 1/1662* (2013.01); *G06F 3/0202* (2013.01); *H01H 13/7073* (2013.01); *H01H 2221/038* (2013.01); *H01H 2221/04* (2013.01)

(58) Field of Classification Search
CPC . G06F 1/1662; G06F 3/0202; H01H 13/7073; H01H 2221/038; H01H 9/00; H01H 13/04; H01H 13/70; H01H 13/705; H01H 19/14; H01H 13/02; H01H 9/26; H01H 13/72
USPC ...................................... 361/679.08; 200/5 A
See application file for complete search history.

(56) References Cited

U.S. PATENT DOCUMENTS

| | | | | |
|---|---|---|---|---|
| 4,990,731 | A * | 2/1991 | Wu | H01H 13/50 200/345 |
| 5,212,473 | A * | 5/1993 | Louis | G06F 3/0219 361/679.08 |
| 8,400,410 | B2 | 3/2013 | Taylor et al. | |
| 9,645,647 | B2 | 5/2017 | Levesque | |
| 10,502,271 | B2 | 12/2019 | Battlogg | |
| 2016/0334871 | A1* | 11/2016 | Levesque | G06F 1/1632 |
| 2018/0298959 | A1* | 10/2018 | Battlogg | F16D 57/002 |

OTHER PUBLICATIONS

Wikipedia, "Magnetorheological fluid," downloaded from https://en.wikipedia.org/wiki/Magnetorheological_fluid on Jul. 22, 2021, 7 pages.

(Continued)

*Primary Examiner* — Renee S Luebke
*Assistant Examiner* — Iman Malakooti
(74) *Attorney, Agent, or Firm* — ZAGORIN CAVE LLP; Robert W. Holland

(57) ABSTRACT

A portable information handling system keyboard includes plural keys that each have a programmable variable-feel response to an end user experience with key interactions in real time. In one example embodiment, a magnetic-rheological fluid is disposed in a chamber of the key to pass through openings formed in a piston that moves downward with a keypress and upward in response to a biasing mechanism, such as a spring disposed in the chamber. Current applied to a coil around the chamber creates a magnetic field that varies the viscosity of the fluid so that key compression and range of motion associated with an input as well as key movement to a raised position are programmable to adjust based upon a sensed key position and movement.

19 Claims, 6 Drawing Sheets

(56) References Cited

OTHER PUBLICATIONS

IEEE, "A Haptic interface with adjustable stiffness using MR fluid," 2015 IEEE International Conference on Advanced Intelligent Mechatronics (AIM), Jul. 7-11, 2015, 2 pages.

Lee, C-H, and Jang, M-G, "Virtual Surface Characteristics of a Tactile Display Using Magneto-Rheological Fluids," MDPI, Department of Mechanical Engineering, Inha University, Yonghun-dong 253, Nam-gu, Incheon 402-751, Korea, Published Mar. 2, 2011, 14 pages.

Yano, S., et al. "Particle size and surface texturing effects on friction of magnetorheological fluids," Tribologia, Finnish Journal of Tribology, vol. 33, No. 2, Feb. 2, 2015, 3 pages.

Xeeltech, "Reinventing User Experience," X Hapticore, downloaded from https://www.xeeltech.com/ on Jul. 22, 2021, 7 pages.

\* cited by examiner

INFORMATION HANDLING SYSTEM VARIABLE FEEL INPUT DEVICE

BACKGROUND OF THE INVENTION

Field of the Invention

The present invention relates in general to the field of information handling system input devices, and more particularly to an information handling system variable feel input device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include processing components that cooperate to process information. Desktop or other stationary systems have a housing that contains the processing components and interacts with end users through peripheral devices, such as a peripheral keyboard and display. Portable systems integrate a display and a power source in a portable housing to support mobile operations. Portable information handling systems allow end users to carry a system between meetings, during travel, and between home and office locations so that an end user has access to processing capabilities while mobile. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs at an integrated keyboard while viewing the display. After usage, convertible information handling systems rotate the lid housing portion over the main housing portion to protect the keyboard and display, thus reducing the system footprint for improved storage and mobility. Typically, portable systems will also interface with peripheral devices, such as a peripheral keyboard and display.

Generally, keyboards provide a common input device for information handling systems that allow end users to interact with a wide variety of applications. Peripheral keyboards typically comply with ANSI and/or ISO standards that define how keyboard keys are arranged and the type of key movements that will generate an input, such as a 4.0 mm key depression. In some portable systems, keyboard keys can have a smaller size and reduced key depression to help reduce the housing size. Typically, keyboard keys tend to have a uniform expected "feel" for the resistance to end user press, the amount of depression to indicate an input and the feedback once an input is completed. A uniform keyboard feel lets an end user have a predictable input environment, however, different applications and end users may have improved performance from non-uniform key press responses, such as the resistance to an input and the depression to complete an input. For example, gamers often desire responsive keyboards that match the end user's input style, while typists who perform word processing may be satisfied with a uniform keyboard key response. Some keyboards offer key modules that have specified key travel actuating and operating forces, such as the CHERRY modules available from KeyMouse. An end user selects a key module with desired operating conditions and inserts the key modules into the keyboard. Although this allows an end user to customize key response, changing key response for specific conditions can be a time consuming process as key modules are swapped out at the keyboard.

SUMMARY OF THE INVENTION

Therefore, a need has arisen for a system and method which provides a programmable adjustment of key response in a keyboard.

In accordance with the present invention, a system and method are provided which substantially reduce the disadvantages and problems associated with previous methods and systems for adapting a keyboard key response. Input device characteristics, such as a keyboard key, are customized by adjusting a magnetic field proximate to a chamber of magneto-rheological fluid in which a member of the input device is disposed. Keystroke distance to an input and key resistance to compression are managed by adjusting a current applied to a magnetizing coil based upon key position and/or velocity.

More specifically, a portable information handling system processes information with a processor and memory disposed in a portable housing and accepts inputs through a keyboard integrated in the portable housing. The keyboard has plural keys with each key's input characteristics managed by a variable stroke module. The variable stroke module forms a chamber that holds magneto-rheological fluid and controls the viscosity of the magneto-rheological fluid with a magnetizing coil disposed around the chamber. A member extends out from the chamber to accept a key and translate key inputs to work against the magneto-rheological fluid and a biasing mechanism that biases the key upward and away from the variable stroke module. For example, the member terminates as a piston within the chamber that has openings to manage the resistance provided by the magneto-rheological fluid to the key based upon the viscosity as set by the strength of a magnetic field formed at the chamber. A position sensor, such as time of flight sensor, a rheostat or a Hall sensor, detects a position of the key and/or velocity of the key to control the magnetic field to target desired key characteristics, such as completing a key stroke at an input press distance by increasing the magnetic field, releasing the key to bias upward after the input and detection of upward movement, such as by turning off the magnetic field, and changing the keystroke characteristics as the key descends downward with a press, such as by linearly increasing current applied to the magnet. In alternative embodiments, inputs at alternative inputs devices may be controlled, such as other push button input devices.

The present invention provides a number of important technical advantages. One example of an important technical advantage is that a keyboard key has a customizable response that enhances an end user experience by adapting keyboard response based upon end user preference for specific use cases, such as different types of applications. An end user may customize the keystroke length from full extension upward by a biasing device to an input detection so that the compression distance can adjust, for example, from 4 mm to 3 mm or less. The end user may also customize how the key feel changes through course of a key input. An end user is provided with customizable key response without having physically change out key modules or adjust physical key settings.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An input device, such as a key of a keyboard, provides a variable feel input response by adjusting a magnetic field proximate a chamber of the input device having a magneto-rheological fluid. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
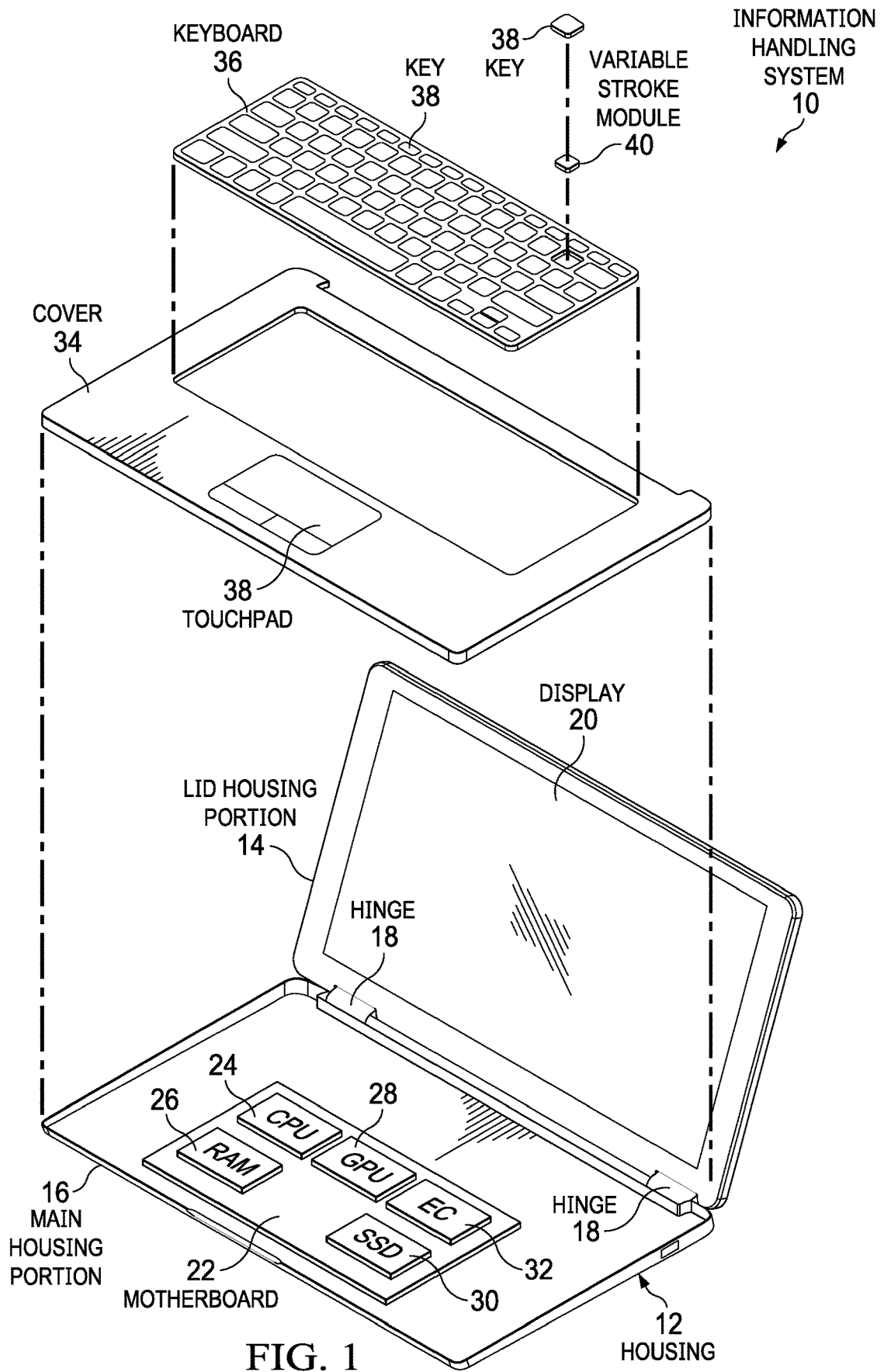
FIG. 1 depicts an exploded perspective view of a portable information handling system having an integrated keyboard with variable stroke modules to vary key feel.

Referring now to FIG. 1, an exploded perspective view depicts a portable information handling system 10 having an integrated keyboard 36 with a variable stroke module 40 to vary key feel. In the example embodiment, information handling system 10 processes information with processing components disposed in a housing 12 having a lid housing portion 14 rotationally coupled to a main housing portion 16 by a hinge 18. Lid housing portion 14 integrates a display 20 that presents information as visual images. In the depicted clamshell open position, main housing portion 16 holds display 20 is a viewing position with keyboard 36 supported on a cover 34 to accept inputs typed by an end user. A motherboard 22 couples to main housing portion 16 to support communication between processing components that cooperate to process information. For instance, a central processing unit (CPU) 24 executes instructions that process information. A random access memory (RAM) 26 stores the instructions and information. A graphics processing unit (GPU) 28 further processes the information to generate pixel values that define visual images presented at display 20. A solid state drive (SSD) 30 or other persistent storage device stores the instructions and information during power down states of the system, such as an operating system and applications that are retrieved at power up to RAM 26 for execution on CPU 24. An embedded controller 32 manages operating conditions for the processing components, such as power supply and thermals. In addition, embedded controller 32 is a keyboard controller that receives inputs from keyboard 36 for communication to CPU 24.

In the example embodiment, keyboard 36 and a touchpad 38 couple to an upper surface of a cover housing portion 34 that, in turn, couples to main housing portion 16. Keyboard 36 is exposed at the upper surface of main housing portion 16 to accept an end user's typed inputs with presses at keys 38 that translate into inputs through variable stroke modules 40. Variable stroke modules 40 have a programmable response to key inputs so that the feel to an end user at a key input is selectable, such as the compression load needed to depress the key and the compression extension needed to complete an input. For example, an end user programs embedded controller 32 to customize the touch response to a key input, and variable stroke module 40 adjusts the response to key touches to achieve the end user selection. For example, a key touch may have a light initial resistance that increases as the key depresses with a very high resistance once an input is recorded. The amount of resistance may change based on context, such as the application executing on the system or the types of presses detected at the keys over time. For example, a gaming application may have a greater or lesser compression resistance to presses and smaller or larger compression stroke than a word processing application. As another example, inputs at keys may be monitored over time to determine a desired key response of the end user making the key inputs, and then variable stroke module 40 may gradually adjust the key response by changing the settings for the variable stroke modules 40 for keyboard 36, such as through embedded controller 32. In the example embodiment, keyboard 36 integrates in portable information handling system 10; however, in alternative embodiments, keyboard 36 may be a peripheral keyboard separate from the information handling system and interfaced through a cable or a wireless interface. In addition variable stroke module 40 may adjust input feel associated with other types of input devices, such as push buttons.

Figure 2:
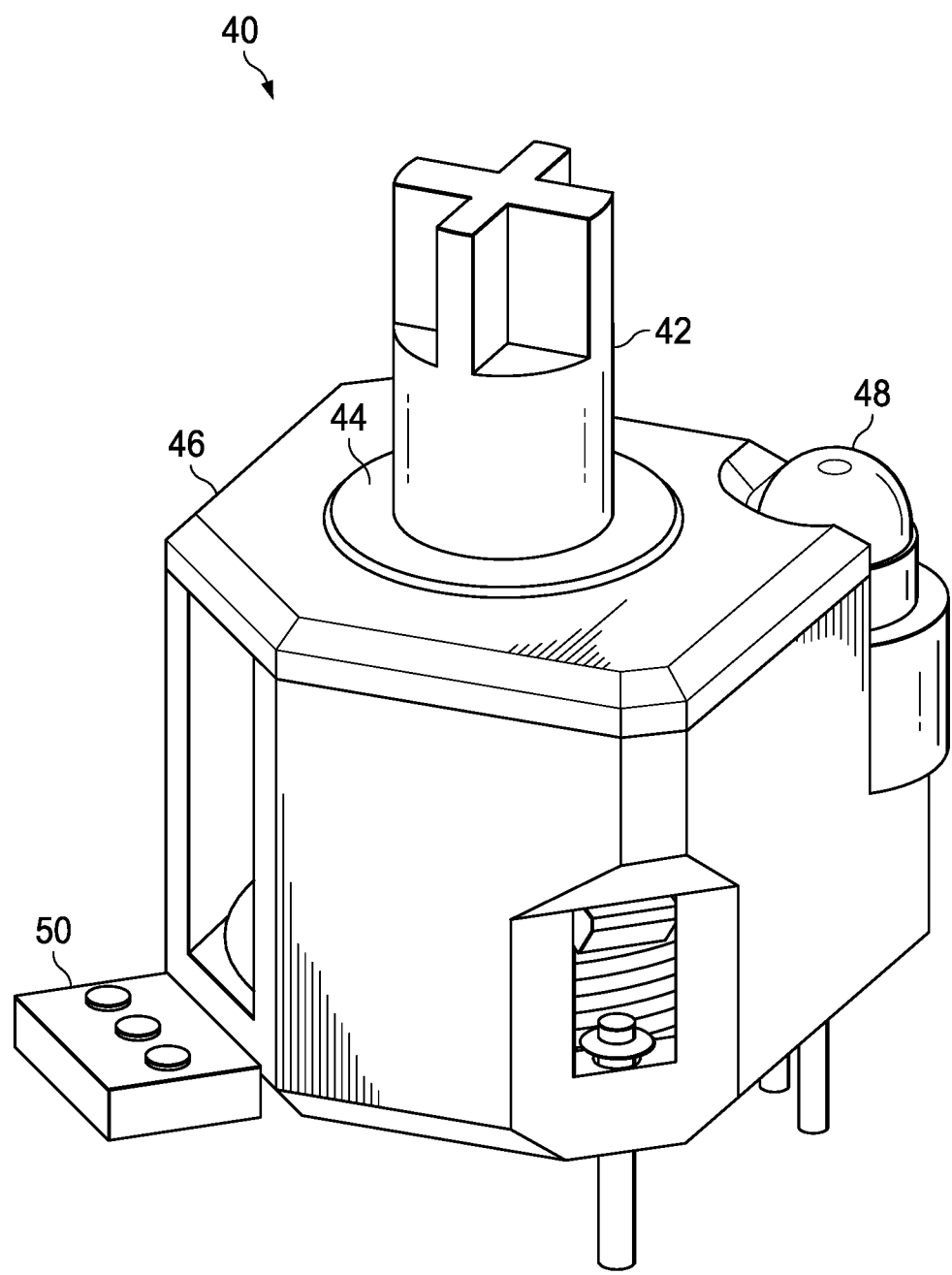
FIG. 2 depicts a side perspective view of an example embodiment of a variable stroke module.

Referring now to FIG. 2, a side perspective view depicts an example embodiment of a variable stroke module 40. A piston 42 extends out of a module housing 46 through a seal 44 that seals a fluid within a chamber defined by module housing 46. A red/green/blue LED 48 is disposed at the upper side of module housing 46 to provide illumination effects. A time of flight sensor 50 is disposed at the base of module housing 46 to detect a position of the key coupled to piston 42. In alternative embodiments, other position sensors may be used, such as rheostat, a Hall sensor with an opposing magnet coupled to the key or other sensors that measures a physical position of the key or piston relative to module housing 46. When an end user presses on a key to depress piston 42 into module housing 46, time of flight sensor 50 detects the reduced distance to set a viscosity of fluid in module housing 46 and to detect when an input distance has been traveled for reporting the press as an input. In addition, time of flight sensors 50 can determine a rate of change of distances over time to estimate a velocity of the key movement up or down. In one embodiment, time of flight sensor 50 includes a processing element, such as a microcontroller with flash memory and stored instructions that manages viscosity of fluid in module housing 46 and reports key inputs to an embedded controller. In an alternative embodiment, time of flight sensor 50 reports detected distance and/or velocities to the embedded controller or other processing resources that manage fluid viscosity and input determinations. Similarly, a Hall sensor may be used to detect position and velocity based upon a magnet coupled to the key.

Figure 3:
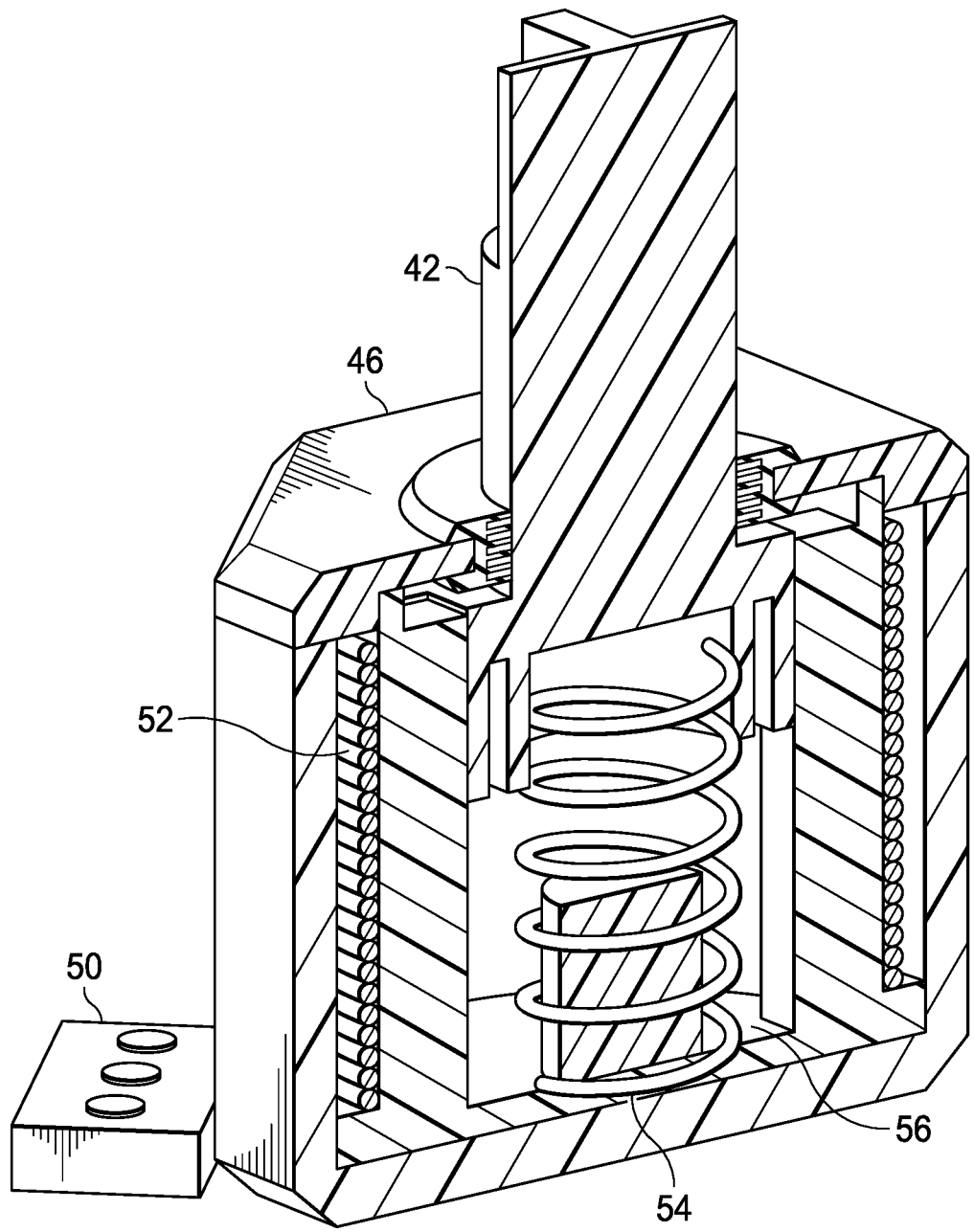
FIG. 3 depicts a side perspective sectional view of the variable stroke module with the piston in a raised position.

Referring now to FIG. 3, a side perspective sectional view depicts the variable stroke module 40 with piston 42 in a raised position. A biasing mechanism 54, such as a spring, is disposed in module housing 46 under piston 42 to bias piston 42 towards a raised position. A magnetizing coil 52 is disposed at the outer circumference of a chamber 56 defined within module housing 46 and interfaced with a current source that selectively applies a current to generate a magnetic field. Within chamber 56, a magneto-rheological fluid is disposed around a piston 42 to dampen and resist movement of piston 42 within chamber 56. In the raised position as depicted, biasing mechanism 54 biases piston 42 upward to a raised position so that magneto-rheological fluid disposed in chamber 56 flows under the base of piston 42. Although biasing mechanism 54 is depicted in the example embodiment as a spring disposed in chamber 56, in alternative embodiments, a spring may be coupled to the plunger or key outside the chamber and may use mechanisms other than a spring. The raised position is the default position of the key, which is raised and prepared to accept an input. In the raised position, magnetizing coil 52 is off so that no magnetic field works to increase the viscosity of the magneto-rheological fluid. An initial press down on piston 42 will result in a base resistance of the magneto-rheological to movement. Once movement of piston 42 is detected by time of flight sensor 50, a current is applied to magnetizing coil 52 to increase the viscosity of the magneto-rheological fluid. The amount of resistance to piston 42 motion is varied by increasing and decreasing current applied to magnetizing coil 52 so that magnetic field increases and decreases. For example, once key movement is detected, a linear increase in current and associated magnetic force gradually increases resistance to the key press until an input is detected, at which point a high current can increase resistance to feel like a complete key depression has taken place. Once an upward motion is detected under the influence of the biasing mechanism 54, current at magnetizing coil 52 may be set to zero to reduce resistance of the magneto-rheological fluid to the upward motion of piston 42. As described above, an end user may customize a key response by establishing variations in current at magnetizing coil 52 based upon positions and or velocities of piston 42 as detected by time of flight sensor 50.

Figure 4:
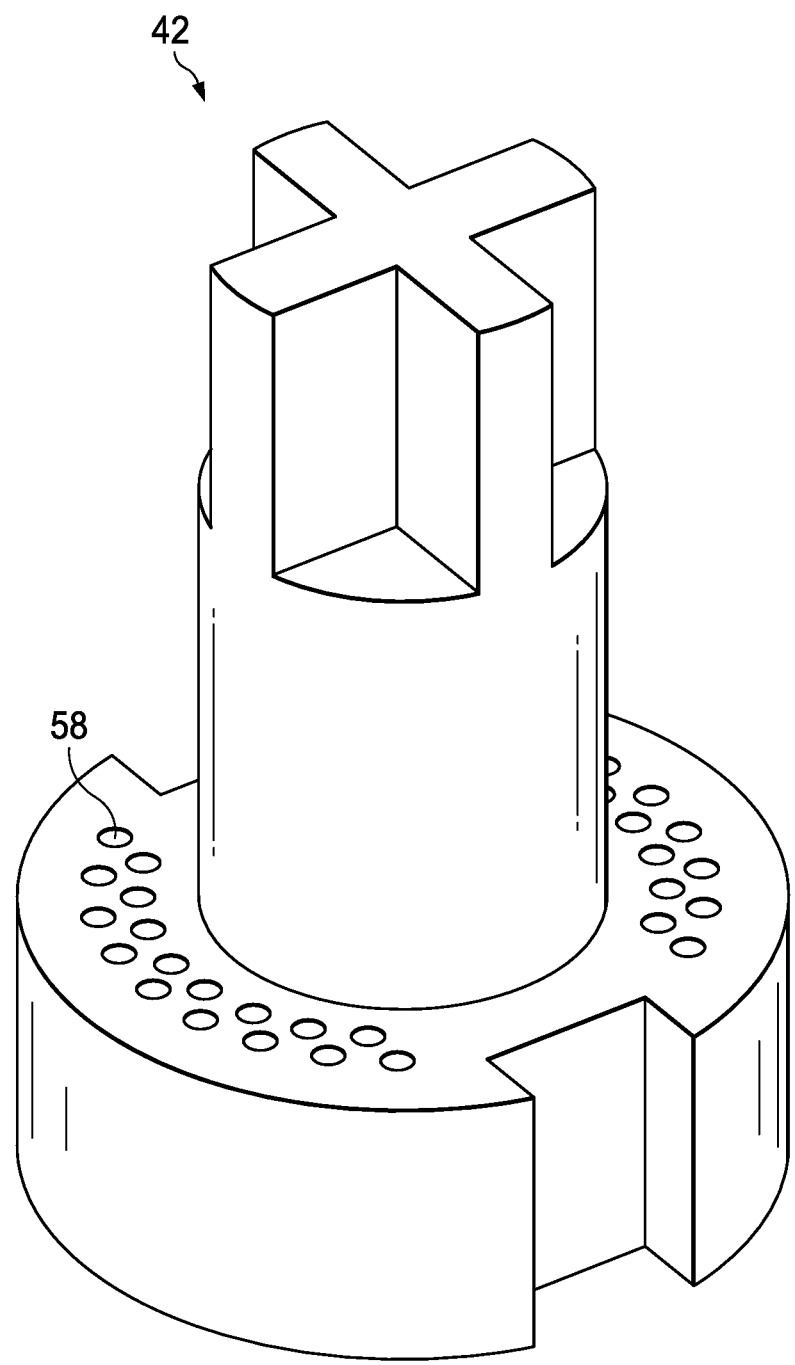
FIG. 4 depicts a side perspective view of an example embodiment of a piston that inserts in the module housing.

Referring now to FIG. 4, a side perspective depicts an example embodiment of a piston 42 that inserts in the module housing. Piston 42 has a member that extends up to a key attachment and a base having plural openings 58. The circumference of the base fits into the circumference of the module housing chamber so that fluid in the chamber is forced to pass through openings 58 as piston 42 moves up and down. The amount of resistance to movement of piston 42 depends upon the viscosity of the magneto-rheological fluid disposed in the chamber, which in turn is set by the strength of the magnetic field defined at the module housing by the magnetizing coil. Although the piston and chamber arrangement provides a reliable key stroke with good support of the input member extending out of the module housing, in alternative embodiments of internal structures may be used to create a reliable keystroke and predictable resistance to key presses.

Figure 5:
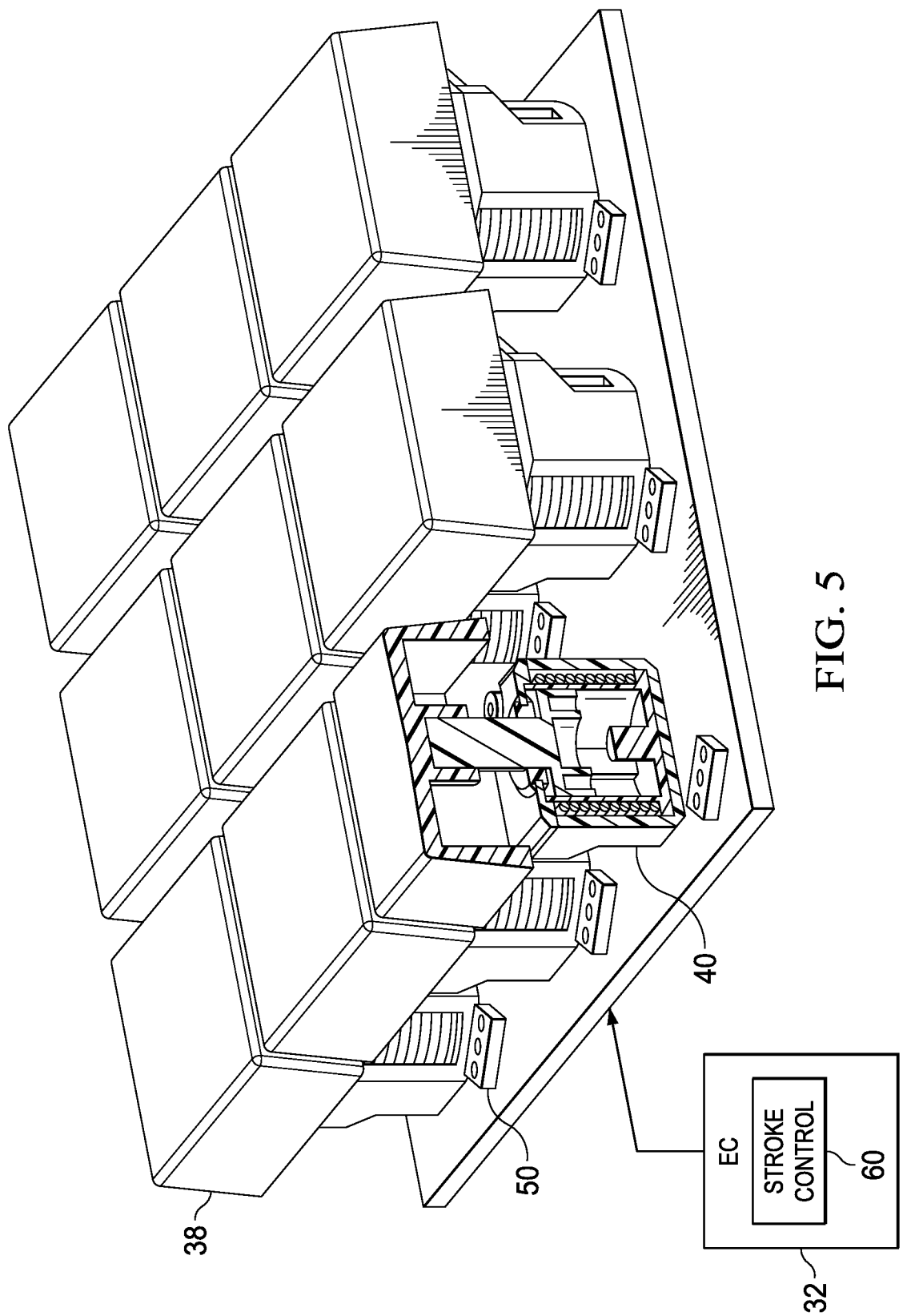
FIG. 5 depicts a side perspective view of plural keys arranged as a part of a keyboard with each key's movement defined by a variable stroke module.

Referring now to FIG. 5, a side perspective view depicts plural keys 38 arranged as a part of a keyboard with each key's movement defined by a variable stroke module 40. The key 38 inputs are reported by each key's time of flight sensor 50 to embedded controller 32 when the key depresses to a programmed depth associated with a completed input. A stroke control module 60 executing on embedded controller 32 manages custom key settings, such as the amount of keystroke to detect an input and the resistance to key movement. For example, an end user inputs desired key customization to an operating system having a driver for a keyboard with available settings for variable stroke modules 40, such distances to the time of flight sensor at which an input is detected and current setting for application to the magnetizing coil based on key position, key velocity and key direction of movement. Stroke control module 60 programs the customization settings in a processing element of each time of flight sensor for application during operations of the keyboard. In an alternative embodiment, embedded controller 32 may receive sensed conditions of the time of flight sensor and directly control the key input characteristics.

Figure 6:
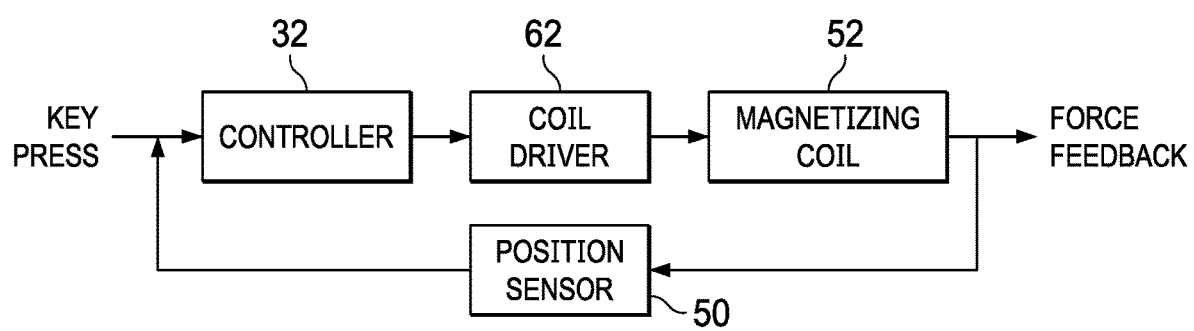
FIG. 6 depicts a block diagram of a feedback control loop that manages key input customization.

Referring now to FIG. 6, a block diagram of a feedback control loop is depicted that manages key input customization. In the example embodiment, a key press is managed by embedded controller 32 by applying a current to a coil driver 62 that manages the amount of current applied at the key through a magnetized coil 52. A positions sensor, such as a time of flight sensor 50, provides changes in position, velocity and direction of the key back to controller 32, which applies the key information to adjust management of the coil driver and magnetizing coil output. The control model may vary based upon the type of magneto-rheological fluid, the size and current capacity of the magnetizing coil, the sensitivity of the position sensor, the size of openings in the input device member that pass the magneto-rheological fluid and the spring resilience. Generally, the available force profiles will be the sum of the damping force provided by the input device member passing through the magneto-rheological fluid and the linear spring force.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor, the memory operable to store the instructions and information; and
   a keyboard coupled to the housing, the keyboard having plural keys, each key having a key housing, a piston, a biasing device and a fluid having a selective viscosity, the key housing defining a chamber, the piston disposed in the chamber with the fluid and biased to an elevated position by the biasing device, each key operable to accept a predetermined press as a key input, selection of viscosity of the fluid in the chamber adjusting a compressive load of the key in response to compression of the fluid in the piston at the key input.

2. The information handling system of claim 1 wherein the biasing device comprises a spring disposed in the chamber under the piston and aligned to bias the piston out of the chamber.

3. The information handling system of claim 1 wherein the fluid comprises a magneto-rheological fluid, each of the plural keys further comprising:
   a coil disposed around the chamber;
   a position sensor operable to detect a position of the piston; and
   a controller interfaced with the coil and the position sensor and operable to apply a current to the coil in response to the position of the piston.

4. The information handling system of claim 3 wherein the piston has base sized to fit in the chamber and having openings that pass through the fluid.

5. The information handling system of claim 3 wherein the position sensor comprises a time of flight sensor.

6. The information handling system of claim 5 wherein the controller comprises logic executing on the time of flight sensor.

7. The information handling system of claim 5 further comprising an embedded controller interfaced with the processor and operable to manage operating conditions at the information handling system, wherein the controller comprises logic executing on the embedded controller.

8. The information handling system of claim 3 wherein the current is zero when the piston biases to a fully up position and increases at a linear rate as the piston moves towards a down position.

9. The information handling system of claim 3 wherein the controller sets the current to zero in response to detection by the position sensor of the piston moving in an upward direction in response to the biasing device.

10. A method for managing input device feel, the method comprising:
    inserting an input device member into a chamber having a magneto-rheological fluid;
    applying a magnetic field at the chamber based at least upon a position of the input device member;
    forming the input device member as a piston sized to fit in the chamber and having openings that pass through the magneto-rheological fluid; and
    adjusting the magnetic field to control resistance of the piston through the magneto-rheological fluid based upon resistance of magneto-rheological fluid passing through the openings.

11. The method of claim 10 wherein the input device member comprises a push button.

12. The method of claim 10 further comprising:
    sensing the input device member position with a time of flight sensor; and
    applying current to a coil around the chamber to adjust the magnetic field based upon the position.

13. The method of claim 10 further comprising biasing the input device member towards a neutral position.

14. The method of claim 13 further comprising:
    detecting movement of the input device member towards the neutral position; and
    in response to the detecting movement, removing the current.

15. The method of claim 13 wherein the input device member comprises a keyboard key.

16. A keyboard key comprising:
    a housing forming a chamber;
    a piston disposed in the chamber and having openings;
    a position sensor operable to detect the piston position;
    a magneto-rheological fluid disposed in the chamber and operable to pass through the openings with a variable resistance based upon a magnetic field applied at the chamber when the piston compresses the magneto-rheological fluid in the chamber in response to an end user input press at the keyboard key;
    a coil disposed at the housing and operable to generate the magnetic field; and
    a controller interfaced with the position sensor and the coil, the controller adjusting current applied to the coil based upon positions sensed by the position sensor.

17. The keyboard key of claim 16 wherein the controller increases the current in response to the position associated with a key input.

18. The keyboard key of claim 17 wherein the controller removes the current in response to the position associated with release of the key after the key input.

19. The keyboard key of claim 18 wherein the position sensor comprises a time of flight sensor.

* * * * *